(12) United States Patent
Foscante

(10) Patent No.: US 9,371,454 B2
(45) Date of Patent: Jun. 21, 2016

US009371454B2

(54) COATING COMPOSITIONS WITH ANTICORROSION PROPERTIES

(75) Inventor: Raymond E. Foscante, Yorba Linda, CA (US)

(73) Assignee: BUNGE AMORPHIC SOLUTIONS LLC, White Plains, NY (US)

( * ) Notice: Subject to any disclaimer, the term of this patent is extended or adjusted under 35 U.S.C. 154(b) by 125 days.

(21) Appl. No.: 12/906,005

(22) Filed: Oct. 15, 2010

(65) Prior Publication Data

US 2012/0094128 A1 Apr. 19, 2012

(51) Int. Cl.
*C09D 5/08* (2006.01)
*C08K 3/32* (2006.01)
*C09D 7/12* (2006.01)

(52) U.S. Cl.
CPC .............. *C09D 5/084* (2013.01); *C09D 7/1216* (2013.01); *C08K 2003/327* (2013.01); *Y10T 428/31511* (2015.04); *Y10T 428/31692* (2015.04)

(58) Field of Classification Search
CPC ............. C08K 2003/327; C09D 5/084; C09D 7/1216; Y10T 428/31511; Y10T 428/31692
See application file for complete search history.

(56) References Cited

U.S. PATENT DOCUMENTS

| | | |
|---|---|---|
| 1,654,404 A | 12/1927 | Blumenberg, Jr. |
| 2,222,196 A | 11/1940 | Vilkomerson |
| 2,222,199 A | 11/1940 | Fleck |
| 3,394,987 A | 7/1968 | Lee et al. |
| 3,650,683 A | 3/1972 | Hloch et al. |
| 3,801,704 A | 4/1974 | Kobayashi et al. |
| 3,926,905 A | 12/1975 | Nose et al. |
| 3,943,231 A | 3/1976 | Wasel-Nielen et al. |
| 4,015,050 A | 3/1977 | Birchall et al. |
| 4,054,678 A | 10/1977 | Benjamin et al. |
| 4,076,221 A | 2/1978 | Groger |
| 4,078,028 A | 3/1978 | Kishi |
| 4,098,749 A | 7/1978 | Hoshino et al. |
| 4,111,884 A | 9/1978 | Takase et al. |
| 4,122,231 A | 10/1978 | Kishi |
| 4,127,157 A | 11/1978 | Gardikes et al. |
| 4,138,261 A | 2/1979 | Adrian et al. |
| 4,147,758 A | 4/1979 | Adrian et al. |
| 4,169,802 A | 10/1979 | Basile et al. |
| 4,171,984 A | 10/1979 | Hosaka et al. |
| 4,177,174 A | 12/1979 | Hayashi et al. |
| 4,216,190 A | 8/1980 | Neely, Jr. |
| 4,227,932 A | 10/1980 | Leah et al. |
| 4,260,591 A | 4/1981 | Benjamin et al. |
| 4,319,926 A | 3/1982 | Nowakowski et al. |
| 4,321,244 A | 3/1982 | Magnier et al. |
| 4,328,033 A | 5/1982 | Boberski et al. |
| 4,329,327 A | 5/1982 | Neely, Jr. et al. |
| 4,333,914 A | 6/1982 | Neely, Jr. et al. |
| 4,364,854 A | 12/1982 | McDaniel et al. |
| 4,364,855 A | 12/1982 | McDaniel et al. |
| 4,375,496 A | 3/1983 | Nowakowski et al. |
| 4,383,866 A | 5/1983 | Nowakowski et al. |
| 4,395,387 A | 7/1983 | Goltz et al. |
| 4,418,048 A | 11/1983 | Dyer et al. |
| 4,435,219 A | 3/1984 | Greigger |
| 4,444,962 A | 4/1984 | McDaniel et al. |
| 4,444,965 A | 4/1984 | McDaniels et al. |
| 4,482,380 A | 11/1984 | Schlegel |
| 4,487,862 A | 12/1984 | Maruya |
| 4,505,954 A | 3/1985 | Hokamura et al. |
| 4,518,513 A | 5/1985 | Lochner et al. |
| 4,542,001 A | 9/1985 | Iino et al. |
| 4,547,479 A | 10/1985 | Johnson et al. |
| 4,567,152 A | 1/1986 | Pine |
| 4,597,796 A | 7/1986 | Ernst et al. |
| 4,622,371 A | 11/1986 | McDaniel |
| 4,640,964 A | 2/1987 | Johnson et al. |
| 4,673,663 A | 6/1987 | Magnier |
| 4,717,701 A | 1/1988 | McDaniel |

(Continued)

FOREIGN PATENT DOCUMENTS

| | | |
|---|---|---|
| BR | 9104581 A | 4/1993 |
| BR | 9400746 A | 10/1995 |
| BR | 9500522 A | 3/1997 |
| DE | 3233092 | 10/1983 |
| DE | 3233092 C1 | 10/1983 |
| EP | 0492137 | 7/1992 |
| EP | 492137 A2 | 7/1992 |
| EP | 492137 A3 | 10/1992 |
| EP | 598464 A1 | 5/1994 |
| EP | 0598464 A1 | 5/1994 |
| EP | 492137 B1 | 7/1996 |
| EP | 598464 B1 | 9/1996 |
| EP | 753546 A2 | 1/1997 |
| EP | 753546 A3 | 4/1997 |
| EP | 0837031 A2 | 4/1998 |
| EP | 837031 A2 | 4/1998 |

(Continued)

OTHER PUBLICATIONS

Finntalc M15 Product Information brochure from Mondo Minerals B.V. (2013).*

(Continued)

*Primary Examiner* — Callie Shosho
*Assistant Examiner* — John Freeman
(74) *Attorney, Agent, or Firm* — Snell & Wilmer L.L.P.

(57) ABSTRACT

Anticorrosive coating compositions comprise a binding polymer and an amorphous aluminum phosphate corrosion inhibiting pigment dispersed therein. The coating composition comprises 1 to 25 percent by weight aluminum phosphate. The binding polymer can include solvent-borne polymers, water-borne polymers, solventless polymers, and combinations thereof. The aluminum phosphate is made by combining an aluminum source with a phosphorous source to form an amorphous aluminum phosphate solid condensate. The coating composition is specially engineered to provide a controlled delivery of phosphate anions of 50 to 500 ppm, and has a total solubles content of less than 1500 ppm. The amorphous aluminum phosphate is preferably free of alkali metals and alkaline earth metals. The amorphous aluminum phosphate has an oil absorption of less than 50, and a surface area of less than about 20 $m^2/g$, The coating composition has a water adsorption potential of up to 25% by weight water.

28 Claims, No Drawings

(56) References Cited

U.S. PATENT DOCUMENTS

| | | | |
|---|---|---|---|
| 4,743,572 A | 5/1988 | Angevine et al. |
| 4,746,568 A | 5/1988 | Matsumoto et al. |
| 4,758,281 A | 7/1988 | Eckler et al. |
| 4,767,802 A | 8/1988 | Sakakibara et al. |
| 4,782,109 A | 11/1988 | DuLaney et al. |
| 4,876,097 A | 10/1989 | Autant et al. |
| 4,888,056 A | 12/1989 | van der Kolk et al. |
| 4,898,660 A | 2/1990 | Wilson et al. |
| 4,972,002 A | 11/1990 | Volkert |
| 4,990,217 A | 2/1991 | Philippot et al. |
| 4,996,103 A | 2/1991 | Henn et al. |
| 5,028,684 A | 7/1991 | Neuhaus et al. |
| 5,030,431 A | 7/1991 | Glemza |
| 5,077,332 A | 12/1991 | Blattler et al. |
| 5,096,933 A | 3/1992 | Volkert |
| 5,108,755 A | 4/1992 | Daniels et al. |
| 5,158,610 A | 10/1992 | Bittner |
| 5,183,656 A | 2/1993 | Uesaka et al. |
| 5,208,271 A | 5/1993 | Gallagher |
| 5,242,744 A | 9/1993 | Schryer |
| 5,256,253 A | 10/1993 | Zidovec et al. |
| 5,296,027 A | 3/1994 | Ernst et al. |
| 5,374,411 A | 12/1994 | Davis et al. |
| 5,403,519 A | 4/1995 | Rittler |
| 5,486,232 A | 1/1996 | Griffith et al. |
| 5,488,016 A | 1/1996 | Rittler |
| 5,496,529 A | 3/1996 | Fogel et al. |
| 5,534,130 A | 7/1996 | Sekhar |
| 5,545,678 A * | 8/1996 | Giencke et al. ............... 523/404 |
| 5,552,361 A | 9/1996 | Rieser et al. |
| 5,698,758 A | 12/1997 | Rieser et al. |
| 5,707,442 A | 1/1998 | Fogel et al. |
| 5,763,015 A | 6/1998 | Hasui et al. |
| 5,783,510 A | 7/1998 | Kida et al. |
| 5,883,200 A | 3/1999 | Tsuchiya et al. |
| 6,002,513 A | 12/1999 | Goossen et al. |
| 6,010,563 A | 1/2000 | Taketani et al. |
| 6,022,513 A | 2/2000 | Pecoraro et al. |
| 6,117,373 A | 9/2000 | Kida et al. |
| 6,139,616 A | 10/2000 | Nagayama et al. |
| 6,177,489 B1 | 1/2001 | Okuse et al. |
| 6,316,532 B1 | 11/2001 | Nozaki et al. |
| 6,342,546 B1 | 1/2002 | Kato et al. |
| 6,409,951 B1 | 6/2002 | Inoue et al. |
| 6,447,741 B1 | 9/2002 | Chester et al. |
| 6,461,415 B1 | 10/2002 | Sambasivan et al. |
| 6,503,304 B2 | 1/2003 | Maul et al. |
| 6,547,870 B1 | 4/2003 | Griessmann et al. |
| 6,562,474 B1 | 5/2003 | Yoshimi et al. |
| 6,589,324 B2 | 7/2003 | Kamo et al. |
| 6,635,192 B1 | 10/2003 | Schwarz |
| 6,646,058 B1 | 11/2003 | Koger |
| 6,669,816 B1 | 12/2003 | Poch et al. |
| 6,677,053 B2 | 1/2004 | Yamaji et al. |
| 6,749,769 B2 | 6/2004 | Gai |
| 6,784,236 B2 | 8/2004 | Sugita et al. |
| 6,797,155 B1 | 9/2004 | Chester et al. |
| 6,838,506 B2 | 1/2005 | Nakao et al. |
| 6,881,782 B2 | 4/2005 | Crater et al. |
| 6,927,185 B2 | 8/2005 | Yamanaka et al. |
| 7,101,820 B2 | 9/2006 | Gai |
| 7,311,944 B2 | 12/2007 | Sambasivan et al. |
| 7,438,881 B2 | 10/2008 | Staffel et al. |
| 7,481,877 B2 | 1/2009 | Gichuhi et al. |
| 7,678,465 B2 | 3/2010 | Sambasivan et al. |
| 7,682,700 B2 | 3/2010 | Sambasivan et al. |
| 9,005,355 B2 | 4/2015 | Foscante |
| 2001/0031316 A1 | 10/2001 | Nozaki et al. |
| 2002/0031679 A1 | 3/2002 | Yano et al. |
| 2002/0040557 A1 | 4/2002 | Felton |
| 2002/0158230 A1 | 10/2002 | Bortnik |
| 2003/0113486 A1 | 6/2003 | Sakai et al. |
| 2003/0138673 A1 | 7/2003 | Sambasivan et al. |
| 2004/0011245 A1 | 1/2004 | Sambasivan et al. |
| 2004/0063815 A1 | 4/2004 | Kinose et al. |
| 2004/0071887 A1 | 4/2004 | Newton |
| 2004/0092637 A1 | 5/2004 | McClanahan |
| 2004/0138058 A1 | 7/2004 | Sambasivan et al. |
| 2004/0261909 A1 | 12/2004 | Hamada |
| 2005/0106384 A1 | 5/2005 | Sambasivan et al. |
| 2005/0276983 A1* | 12/2005 | Kashiwada et al. .......... 428/416 |
| 2006/0045831 A1 | 3/2006 | Galembeck et al. |
| 2006/0057407 A1 | 3/2006 | Sambasivan et al. |
| 2006/0211798 A1 | 9/2006 | Galembeck et al. |
| 2006/0246149 A1 | 11/2006 | Buchholz et al. |
| 2007/0215005 A1 | 9/2007 | Nicolai |
| 2008/0038556 A1 | 2/2008 | Galembeck et al. |
| 2008/0085965 A1 | 4/2008 | Imakita et al. |
| 2009/0064893 A1 | 3/2009 | Sambasivan et al. |
| 2009/0149317 A1 | 6/2009 | Stamires et al. |
| 2009/0217841 A1 | 9/2009 | Galembeck et al. |
| 2010/0180801 A1 | 7/2010 | Thauern et al. |
| 2010/0203318 A1 | 8/2010 | Galembeck et al. |
| 2012/0094130 A1 | 4/2012 | Foscante et al. |

FOREIGN PATENT DOCUMENTS

| | | |
|---|---|---|
| EP | 1241131 A1 | 9/2002 |
| EP | 1241131 A1 | 9/2002 |
| EP | 1241131 B1 | 1/2006 |
| EP | 1807475 | 7/2007 |
| EP | 1807475 A2 | 7/2007 |
| EP | 1878700 A1 | 1/2008 |
| EP | 837031 A3 | 4/2008 |
| EP | 2066585 A1 | 6/2009 |
| FR | 2157866 A1 | 6/1973 |
| FR | 2157866 A1 | 6/1973 |
| FR | 2157866 B1 | 11/1975 |
| GB | 1379562 A | 1/1975 |
| GB | 1403242 A | 8/1975 |
| GB | 1403242 A | 8/1975 |
| GB | 2038791 A | 7/1980 |
| GB | 2038791 A | 7/1980 |
| GB | 2042573 A | 9/1980 |
| GB | 2038791 B | 12/1982 |
| GB | 2042573 B | 1/1983 |
| GB | 2221684 | 2/1990 |
| GB | 2221684 A | 2/1990 |
| GB | 0517258 | 10/2005 |
| JP | 53-19345 | 1/1978 |
| JP | 53019345 A | 2/1978 |
| JP | 53-59725 | 5/1978 |
| JP | 53059725 A | 5/1978 |
| JP | 55-160059 | 12/1980 |
| JP | 55160059 A | 12/1980 |
| JP | 56-32553 | 4/1981 |
| JP | 56-32554 | 4/1981 |
| JP | 56-32555 | 4/1981 |
| JP | 56-32556 | 4/1981 |
| JP | 56032553 A | 4/1981 |
| JP | 56032554 A | 4/1981 |
| JP | 56032555 A | 4/1981 |
| JP | 56032556 A | 4/1981 |
| JP | 56-131671 | 10/1981 |
| JP | 56131671 A | 10/1981 |
| JP | 57-158267 | 9/1982 |
| JP | 57158267 A | 9/1982 |
| JP | 60-215091 | 10/1985 |
| JP | 60215091 A | 10/1985 |
| JP | 61-101566 | 5/1986 |
| JP | 61101566 A | 5/1986 |
| JP | 61-286209 | 12/1986 |
| JP | 61286209 A | 12/1986 |
| JP | 62-4753 | 1/1987 |
| JP | 62004753 A | 1/1987 |
| JP | 63-101454 | 5/1988 |
| JP | 63101454 A | 5/1988 |
| JP | 1-110567 | 4/1989 |
| JP | 1110567 A | 4/1989 |
| JP | 1-167381 | 7/1989 |
| JP | 1167381 A | 7/1989 |
| JP | 1-234475 | 9/1989 |
| JP | 1234475 A | 9/1989 |
| JP | 1-249638 | 10/1989 |

(56) References Cited

FOREIGN PATENT DOCUMENTS

| | | |
|---|---|---|
| JP | 1249683 A | 10/1989 |
| JP | 4090874 A | 3/1992 |
| JP | 4-90874 | 3/1993 |
| JP | 06-136296 | 5/1994 |
| JP | 6-179866 | 6/1994 |
| JP | 6179866 A | 6/1994 |
| JP | 6-286054 | 10/1994 |
| JP | 6286054 A | 10/1994 |
| JP | 7-241954 | 9/1995 |
| JP | 7241954 A | 9/1995 |
| JP | 7-330451 | 12/1995 |
| JP | 7330451 A | 12/1995 |
| JP | 8-72197 | 3/1996 |
| JP | 8072197 A | 3/1996 |
| JP | 8-268704 | 10/1996 |
| JP | 8-283619 | 10/1996 |
| JP | 8268704 A | 10/1996 |
| JP | 8283619 A | 10/1996 |
| JP | 10-139923 | 5/1998 |
| JP | 10139923 A | 5/1998 |
| JP | 10-213374 | 8/1998 |
| JP | 10-213374 A | 8/1998 |
| JP | 10-235782 | 9/1998 |
| JP | 10235782 A | 9/1998 |
| JP | 11-147261 | 2/1999 |
| JP | 11047261 A | 2/1999 |
| JP | 2001-189127 | 4/2001 |
| JP | 2001089127 A | 4/2001 |
| JP | 2001-329221 | 11/2001 |
| JP | 2001329221 A | 11/2001 |
| WO | 2006024959 A2 | 3/2006 |
| WO | WO-2006024959 A2 | 3/2006 |
| WO | 2006024959 A3 | 7/2006 |
| WO | 2007104465 A2 | 9/2007 |
| WO | 2007104465 A3 | 11/2007 |
| WO | 2008017135 A1 | 2/2008 |
| WO | 2009073112 A1 | 6/2009 |
| WO | 2009100510 A2 | 8/2009 |
| WO | 2009100510 A3 | 1/2010 |

OTHER PUBLICATIONS

International Search Report dated Jan. 20, 2012 for International PCT/US2011/056459 filed Oct. 14, 2011.

Beppu et al; Aluminum Phosphate Particles Containing Closed Pores: Preparation, Characterization, and Use as a White Pigment; Journal of Colloid and Interface Science; vol. 178; Article No. 0097; 1996; pp. 93-103, XP002368235; ISSN: 0043-9088.

Beppu et al; Self-Opacifying Aluminum Phosphate Particles for Paint Film Pigmentation; Journal of Coatings Technology; vol. 69, No. 867, Apr. 1997; pp. 81-88; XP009061770; ISSN: 0361-8773.

Burrell et al; Aluminium Phosphate Adjuvants Prepared by Precipitation at Constant pH. Part I: Composition and Structure, Vaccine 19 (2001) 275-281.

Burrell et al; Aluminium Phosphate Adjuvants Prepared by Precipitation at Constant pH. Part II: Physicochemical Properties, Vaccine 19 (2001) 282-287.

Faison et al.; Use of Polyphosphates as Deflocculants of Alumina; Ceramic Engineering & Science Proceedings; vol. 12[1-2]; 1991; pp. 106-115.

Filho et al; Genesis of a Solid Foam: Iron (III) Metaphosphate Transformation in Sol-Gel Crystallization Processes, Langmuir 1990, 6, pp. 1013-1016.

Lima et al; Nanosized Particles of Aluminum Polyphosphate, Langmuir, vol. 12, No. 7, pp. 1701-1703.

Lima et al; Non-Crystalline Aluminum Polyphosphates: Preparation and Properties, J. Braz. Chem. Soc.; vol. 7, No. 3; 1996; pp. 2009-2215.

Lima et al; Particles of Aluminum Metaphosphate Containing Closed Pores. Preparation, Characterization and Optical Properties, Colloids and Surfaces A: Physicochemical and Engineering Aspects, vol. 75; 1993; pp. 65-74.

Monteiro et al; Aluminum Polyphosphate Nanoparticles: Preparation, Particle Size Determination, and Microchemistry, Journal of Colloid and Interface Science; vol. 217, Article 10; 1999; pp. 237-248; jcis.1999.6381, http://www.idealibrary.com.

Rosseto et al.; Hydrous Non-Crystalline Phosphates: Structure, Function and a new White Pigment; J. Braz. Chem. Soc.; vol. 17, No. 8; Jun. 2006; pp. 1465-1472; XP002432072; ISSN: 0103-5053.

Souza et al; Formation of Opaque Films by Biomimetic Process, J. Mat. Sci.; vol. 32; 1997; pp. 2207-2213; XP002432073.

Souza et al; Improved Latex Film—Glass Adhesion Under Wet Environments by Using and Aluminum Polyphosphate Filler; 1998; pp. 358-377.

Yang et al; Experimental Observations of Water—Framework Interactions in a Hydrated Microporous Aluminum Phosphate, J. Phys. Chem. B.; vol. 109, 2005; pp. 4464-4469.

WPI Database Search Results, Derwent Publications Ltd., London, GB.

Beppu, M.M., Lima, E. C.O., and Galembeck, F., Aluminum Phosphate Particles Containing Closed Pores: Preparation, Characterization, and Use as a White Pigment, Journal of Colloid and Interface Science 178, 93-103 (1996), Article No. 0097.

Beppu, M. M., Lima, E. C. O., Sassaki, R.M., and Galembeck, F., Self-Opacifying Aluminum Phosphate Particles for Paint Film Pigmentation, Journal of Coatings Technology, vol. 69, No. 867, 81-88, Apr. 1997.

Souza, E. F., and Galembeck, F., Formation of Opaque Films by Biomimetic Process, Journal of Material Science 32 (1997) 2207-2213.

Souza, E.F., Silva, M. D. C., and Galembeck, F., Improved Latex Film—Glass Adhesion Under Wet Enviroments by Using and Aluminum Polyphosphate Filler, [publication], 358-377 (1998).

Lima, E. C. O., Beppu, M. M., and Galembeck, F., Nanosized Particles of Aluminum Polyphosphate, Langmuir, vol. 12, No. 7, pp. 1701-1703.

Monteiro, V. A. R., Souza, E. F., Azevedo, M. M. M., and Galembeck, F., Aluminum Polyphosphate Nanoparticles: Preparation, Particle Size Determination, and Microchemistry, Journal of Colloid and Interface Science 217, 237-248 (1999), Article ID jcis.1999.6381, http://www.idealibrary.com.

Burrell, L. S., Johnston, C.T., Schulze, D. Klein, J. White, J. L. and Hem, S. L., Aluminium Phosphate Adjuvants Prepared by Precipitation at Constant pH. Part I: Compositon and Structure, Vaccine 19 (2001) 275-281.

Burrell, L. S., Johnston, C.T., Schulze, D. Klein, J. White, J. L. and Hem, S. L., Aluminium Phosphate Adjuvants Prepared by Precipitation at Constant pH. Part II: Physicochemcial Properties, Vaccine 19 (2001) 282-287.

Yang, H., Walton, R. I., Biedasek, S., Antonijevic, S., and Wimperis, S., Experimental Observations of Water—Framework Interactions in a Hydrated Microporous Aluminum Phosphate, J. Phys. Chem. B. 2005, 109, 4464-4469.

Filho, P.P.A., and Galembeck, F., Genesis of a Solid Foam: Iron (III) Metaphosphate Transofrmation in Sol-Gel Crystallization Processes, Langmuir 1990, 6, 1013-1016.

Lima, E. C. O., and Galembeck, F., Particles of Aluminum Metalphosphate Containing Closed Pores. Preparation, Characterization and Optical Properties, Colloids and Surfaces A: Physicochemical and Engineering Aspects, 75 (1993) 65-74.

White Pigment prodn.—by mixing aq. Solns. of metal phosphate, sodium phosphate and ammonium hydroxide, drying the ppte., milling, sievning and igniting: Derwent; 1993; XP002368265; abstract.

Rosetto R et al.; Hydrous non-crystalline phosphates: structure, function and a new white pigment; J. Braz. Chem. Soc., Sao Paulo, BR; vol. 17, No. 8; Jun. 2006; pp. 1465-1472; XP002432072; ISSN: 0103-5053.

Lima, E. C. O., Beppu, M. M. Galembeck, F., Filho, J. F. V., and Soares, D. M., Non-Crystalline Aluminum Polyphosphates: Preparation and Properties, J. Braz, Chem. Soc., vol. 7, No. 3, 2009-215, 1996, printed in Brazil.

International Search Report and the Written Opinion of the International Searching Authority, or the Declaration, Mailed Jan. 20, 2012.

International Preliminary Report on Patentability, completed on Jan. 22, 2013.

(56) References Cited

OTHER PUBLICATIONS

Non-Final Office Action U.S. Appl. No. 12/905,999 dated Jan. 2, 2013, total 87 pages.
Aluminum Triphosphate (k-White), Tayca Corporation (2009).
Felipe Lagno and George P. Demopoulos, Synthesis of Hydrated Aluminum Phosphate, AlP04-1.5H20 (AlP04-H3), by Controlled Reactive Crystallization in Sulfate Media, Ind. Eng. Chem. Res., vol. 44, No. 21, 2005, pp. 8033-8038, American Chemical Society, Published on Web Sep. 10, 2005, IE0505559.
Applicant's Response/Amendment dated Nov. 27, 2007, United States Patent and Trademark Office, in re Application of Thomas Staffel et al., U.S. Appl. No. 11/520,787, filed Sep. 14, 2006, Applicant's Remarks, pp. 5 to 6.
Technical data sheet for the BK111 material, BK Giulini, Aluminumphosphate Gel Powder, B 111, Spec. No. 30179-2, Quality Ph.Eur.4, p. 1/1, printed Oct. 23, 2006/09:52, filed: 763559.
AU; Office Action dated Feb. 16, 2015 in Australian Application No. 2011315833.
SG; Examination Report dated Jun. 13, 2014 in Singapore Application No. 201302843-6.
USPTO; Final Office Action dated Jul. 16, 2013 in U.S. Appl. No. 12/905,999.
USPTO; Non-Final Office Action dated Feb. 26, 2014 in U.S. Appl. No. 12/905,999.
USPTO; Final Office Action dated Nov. 6, 2014 in U.S. Appl. No. 12/905,999.
USPTO; Non-Final Office Action dated Jul. 14, 2015 in U.S. Appl. No. 12/905,999.
Cytec Industries, Inc. "Two Component Epoxy Amine Systems," (2009).
EA: Office Action dated Jun. 1, 2015 in Eurasian Application No. 201390563.

\* cited by examiner

COATING COMPOSITIONS WITH ANTICORROSION PROPERTIES

FIELD OF THE INVENTION

This invention relates to coating compositions having anticorrosion properties and, more specifically, to coating compositions that are specially formulated to include an amorphous aluminum phosphate corrosion inhibiting pigment and methods for making the same.

BACKGROUND OF THE INVENTION

Coating compositions formulated to include one or more material to provide anticorrosion properties, used for forming a film layer on the surface of metallic substrates, are known in the art. Such coating compositions make use of materials known to provide some degree of protection against corrosion by one of three different mechanisms.

A first mechanism of corrosion control in coating compositions is one provided by a formulation where a binder composition, that imparts a high degree of moisture and water diffusion resistance to the resulting cured film, is combined with a pigment or solid component that enhances the barrier properties of the film composition, thereby providing a physical barrier to any water passing into the cured coating film to protect the underlying coated metal substrate surface from corrosion. Pigment materials or solid components useful in this regard include aluminum, iron oxide, mica, talc, talc, calcium silicate, and barium sulfate in particle and/or flake form.

A second mechanism of corrosion control in coating compositions is one provided by the placement of a desired material adjacent the metallic substrate surface that is selected to sacrificially corrode upon contact with any water and oxygen passing into the cured coating film, thereby sacrificially corroding to cathodically protect and prevent the underlying metallic substrate from corroding. Zinc metal is an example material useful in this regard, and can be provided on the surface of the substrate as a constituent in a coating composition or can be provided separately therefrom.

A third mechanism of corrosion control is one where the coating composition makes use of a material that is corrosion inhibiting, e.g., a corrosion inhibiting pigment, in that such material, upon being contacted with water and oxygen, releases a material that diffuses to the substrate surface and either adsorbs on the substrate to form an impermeable layer or forms a reaction product with the surface of the metallic substrate, thereby preventing it from reacting with water, oxygen, and other corrosive materials. This operates to passivate the substrate surface and thereby protect it from corrosion. Materials known to be useful in this regard include calcium zinc phosphomolybdate, aluminum triphosphate, zinc phosphate, zinc-iron phosphate, strontium zinc phosphosilicate, calcium phosphosilicate, zinc aluminum phosphate, lead-containing materials, and chromate-containing materials.

While anticorrosion coating compositions known in the art provide some degree of protection against unwanted corrosion, such known coating compositions may rely on the use of materials that present a danger/hazard to the environment and/or a health or safety hazard to people and for these reasons the use of such coating compositions have or are being restricted or prohibited altogether. Additionally, such known coating compositions, while providing some degree of corrosion protection, are unable to provide a desired or needed level of corrosion control that is sufficient to meet the demands of certain end-use applications.

It is, therefore, desired that an anticorrosion coating composition be formulated in a manner that provides a desired degree of corrosion control/resistance without the use of materials being regulated or otherwise known to present a hazard/danger to the environment and/or health or safety issues to people. It is desired that such anticorrosion coating compositions be formulated in a manner that provides a desired improved degree of corrosion resistance when compared to known coating compositions, thereby meeting the needs of certain end-use applications. It is further desired that such anticorrosion coating composition be formulated from readily available materials, and/or be made according to a process, that facilitates manufacturing the coating composition in a manner that does not require the use of exotic equipment, that is not unduly labor intensive, and that is economically feasible.

SUMMARY OF THE INVENTION

Anticorrosive coating compositions as disclosed herein comprise a binding polymer and aluminum phosphate dispersed within the binding polymer. The binding polymer can be selected from the group including polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof. The aluminum phosphate comprises amorphous aluminum phosphate. In a preferred embodiment, the aluminum phosphate is amorphous aluminum phosphate at the time that is it combined with the binding polymer and at the time that the coating composition is applied to a surface of a metallic substrate. The coating composition comprises in the range of from about 1 to 25 percent by weight aluminum phosphate.

In an example embodiment, the coating composition provides a controlled phosphate delivery, e.g., of phosphate anions, in the range of from about 50 to 500 ppm, and preferably in the range of from about 100 to 200 ppm. In an example embodiment, the coating composition has total solubles content of less than about 1500 ppm, less than 800 ppm, preferably less than about 400 ppm, and more preferably of from about 100 to 250 ppm. The amorphous aluminum phosphate is preferably substantially free of alkali metals and alkaline earth metals.

Anticorrosion coating compositions are formed by combining starting materials comprising an aluminum source with a phosphorous source, and reacting the combined starting materials to form a solution comprising an amorphous aluminum phosphate solid condensate. The aluminum source can be selected from the group including sodium aluminate, aluminum hydroxide, aluminum sulfate, and combinations thereof, and the phosphorus source can be phosphoric acid or phosphate salt. In an example embodiment, the process of making the aluminum phosphate is specifically controlled to produce amorphous aluminum phosphate having the desired engineered properties of controlled phosphate anion release with a reduced/low solubles content.

The amorphous aluminum phosphate has properties of low oil absorption of less than about 50, and low surface area of less than about 20 m$^2$/g. Additionally, in a preferred embodiment, the amorphous aluminum phosphate that is produced is free of any alkali metals or alkaline earth metals, The amorphous aluminum phosphate is dried at a temperature of less than about 200° C. Thereafter, the amorphous aluminum phosphate is mixed with a binding polymer to form the anticorrosion coating composition.

Such anticorrosion coating compositions can be used as a primer coat, a mid-coat, and/or a top-coat coating depending on the particular formulation and/or end use application. The anticorrosion coating composition can be applied to a metal substrate and allowed to dry to form fully-cured film. In the event that the binding polymer is solvent-borne, the amorphous aluminum phosphate in the cured film controls corrosion of the underlying substrate by both adsorbing and/or absorbing water entering the film and providing passivating phosphate anion.

Anticorrosion coating compositions as disclosed herein are formulated in a manner that provides a desired degree of corrosion control/resistance without the use of materials being regulated or otherwise known to present a hazard/danger to the environment and/or health or safety issues to people. Further, such anticorrosion coating compositions are formulated in a manner that provides a desired improved degree of corrosion resistance, when compared to known coating compositions, thereby meeting the needs of certain end-use applications. Such anticorrosion coating compositions are formulated from readily available materials, and are made by processes, that facilitate manufacturing in a manner that does not require the use of exotic equipment, that is not unduly labor intensive, and that is economically feasible.

DETAILED DESCRIPTION

Anticorrosion coating compositions, and methods for making the same, are disclosed herein. Such anticorrosion coating compositions are formulated to include a desired amount of an amorphous aluminum phosphate corrosion inhibiting pigment that has been specially engineered to provide combined desired features of a controlled release/delivery of an optimum amount of passivating anion, e.g., phosphate anion, to inhibit corrosion, and a controlled amount of total solubles. Together, such features permit the anticorrosion coating composition to provide an improved degree of corrosion resistance to an underlying metallic substrate surface without compromising film and composite integrity and stability, thereby offering such improved corrosion resistance for an extended service life when compared to conventional anticorrosion coating compositions. Conventional anticorrosion coating compositions neither provide a controlled release rate of passivating anion nor have a controlled amount of total solubles.

Amorphous aluminum phosphates used in the anticorrosion coating compositions disclosed herein are also specially designed to have a high level of compatibility with a variety of different binding polymers or binding polymer systems useful for forming such coating composition, thereby providing a high degree of flexibility and choice in formulating anticorrosion coating compositions to meet the needs and conditions of a variety of end-use applications in a number of different end-use industries.

Anticorrosion coating compositions comprise a desired binding polymer that can be selected depending on the different end-use application as well as other factors. Example binding polymers include those currently used for making known anticorrosion coating compositions, and can be selected from the general groups of water-borne polymers, solvent-borne polymers, and combinations thereof. Example water-borne polymers useful for making anticorrosion coating compositions include acrylic and acrylic copolymers, alkyd, epoxy, polyurethane, and silicone, and polysiloxane polymers. Example solvent-borne and/or non-aqueous polymers useful for making anticorrosion coating compositions include acrylic and acrylic copolymers, epoxy, polyurethane, silicone, polysiloxane, polyester, and alkyd. Preferred binding polymers include acrylic copolymer latex, alkyd, polyurethane and epoxy polymers.

In an example embodiment, anticorrosion coating compositions comprise in the range of from about 15 to 75 weight percent, preferably in the range of from about 20 to 60 weight percent, and more preferably in the range of from about 20 to 35 weight percent of the binding polymer based on the total weight of the coating composition. An anticorrosion coating composition comprising less than about 15 percent by weight of the binding polymer may include a greater amount of the corrosion inhibiting pigment than necessary to provide a desired degree of corrosion resistance. An anticorrosion coating composition comprising greater that about 75 percent by weight of the binding polymer may include an amount of the corrosion inhibiting pigment that is insufficient to provide a desired degree of corrosion resistance. While certain amounts of the binding polymer have been provided, it is to be understood that the exact amount of the binding polymer that is used to formulate anticorrosion coating compositions will vary depending on such factors as the type of binding polymer used, the type and/or quantity of inhibiting pigment that is used, and/or the particular end-use application, e.g., the substrate to be coated and the corrosive environment intended for the substrate.

Corrosion inhibiting pigments useful for making anticorrosion coating compositions comprises phosphate-containing compounds. Preferred phosphate-containing compounds are aluminum phosphates. Aluminum phosphates useful in this regard include amorphous aluminum phosphates, crystalline aluminum phosphate, and combinations thereof. Preferred aluminum phosphates are amorphous aluminum phosphates, and most preferred aluminum phosphates are amorphous aluminum orthophosphates. The use of amorphous aluminum phosphates is preferred because amorphous aluminum phosphates have been shown to release an amount of phosphate anion, when diffusing water contacts the pigment in the coating, sufficient to provide passivation to the metal substrate. Specifically, the anticorrosion coating as disclosed herein is specially engineer to provide a controlled release rate of the phosphate anion tailored for this purpose.

Further, it has been found that amorphous aluminum phosphate compositions can be prepared having a soluble material content sufficiently low such that solubles do not cause osmotic blistering of a cured film when such film is contacted with water. Accordingly, amorphous aluminum phosphates as used in anticorrosion coating compositions are specially engineered to both provide a controlled release or delivery of passivating anion, e.g., phosphate anions, to inhibit corrosion, and to have a total low solubles content to avoid osmotic blistering.

In an example embodiment, the amorphous aluminum orthophosphates are amorphous aluminum hydroxy phosphates. Amorphous aluminum hydroxy phosphates are preferred because they provide uniform dispersion properties within the composition and the dispersion remains stable throughout the shelf-life of the formulation. The hydroxyl content of the amorphous aluminum hydroxy phosphate is the unique functional group that provides matrix stability by providing hydrogen bonds with suitable groups of the binding polymer of the formulation, e.g., such as carboxyl groups, amino groups, hydroxyl groups, acid groups and the like. This feature is unique to the amorphous aluminum hydroxy phosphate and is not present in crystalline or other types of amorphous phosphates. By adjusting the Al—OH to Al—OP ratio in the complex it is possible to regulate the release of secondary components incorporated in the material in the condensation process. Such secondary components can include sodium phosphate salts that result from the synthesis reaction.

Anticorrosion coating compositions are formulated to contain a specific amount of the inhibiting pigment calculated to provide a sufficient amount of the passivating anion when placed into end use to inhibit corrosion. In an example embodiment, the anticorrosion coating composition comprises in the range of from about 3 to 25 weight percent, preferably in the range of from about 5 to 15 weight percent, and more preferably in the range of from about 8 to 12 weight percent of the amorphous aluminum phosphate based on the total weight of the coating composition dry film. An anticorrosion coating composition comprising less than about 3 percent by weight of the amorphous aluminum phosphate may contain an amount that is insufficient to provide a desired degree of corrosion resistance. An anticorrosion coating composition comprising greater that about 25 percent by weight of the amorphous aluminum phosphate may include an amount more than necessary to provide a desired degree of corrosion resistance, and such additional amount can operate to impair long-term stability and/or integrity of the cured coating film. While certain amounts of the amorphous aluminum phosphate have been provided, it is to be understood that the exact amount of the amorphous aluminum phosphate that is used to formulate anticorrosion coating compositions will vary depending on such factors as the type and/or quantity of binding polymer used, and/or the particular end-use application, e.g., the substrate to be coated and the corrosive environment intended for the substrate As briefly noted above, the amorphous aluminum phosphate is specially engineered to provide a controlled release or delivery of one or more passivating anions upon being contacted with water and oxygen, when the coating composition is applied to the surface of a metallic substrate, formed into a cured film, and placed into a corrosive environment. Over time, water/moisture migrates or diffuses into the applied coating film, which water comes into contact with the phosphate component that is available in the film. Such contact with water promotes release/delivery of phosphate anion from the amorphous aluminum phosphate in a controlled manner. These phosphate anions react with iron species at the surface of the underlying oxide on the metal surface or the metallic substrate itself to form a passivating film thereon that operates to form a barrier protecting the underlying metallic surface from corrosion.

A feature of the amorphous aluminum phosphates used to make these anticorrosion coating compositions is that they are engineered to release/deliver a controlled amount of the phosphate anions. Specifically, to release/deliver an amount of the phosphate anions calculated to provide an optimum level of corrosion protection without sacrificing other coating cured-film performance properties that may otherwise compromise the effective film service life.

In an example embodiment, the amorphous aluminum phosphate is engineered to release in the range of from about 50 to 500 ppm, and preferably 100 to 200 ppm of the passivating phosphate anion when present in a cured film placed into an end-use application. The amount of passivating anion to be delivered depends on a number of different factors such as the loading or amount of the amorphous aluminum phosphate used to make the anticorrosion composition, the type of binding polymer that is used, the type of metallic substrate being protected, and the type of corrosion environment present in the end-use application. In a preferred embodiment, where the metallic substrate being protected comprises iron and the corrosion environment comprises water, oxygen, and other corrosive salts, the amorphous aluminum phosphate is engineered to release approximately 160 ppm of the passivating phosphate anion.

An amorphous aluminum phosphate having a controlled release less than about 50 ppm of the passivating anion may not provide a sufficient amount of the passivating anion to inhibit corrosion. An amorphous aluminum phosphate having a controlled release greater than about 500 ppm of the passivating anion, while providing a level sufficient to inhibit corrosion, may provide too much passivating anion that can cause blistering or other unwanted effects in the cured film that can impair its long term integrity and stability, thereby possibly reducing the effective service life of the coating.

Anticorrosion coating compositions are engineered having a controlled or minimized level of solubles. As used herein, the term "solubles" and "nonpassivating solubles" are used interchangeable to refer to materials usually produced as a byproduct of making the amorphous aluminum phosphate and can include alkali metals such as sodium, potassium, and lithium, and such anions as sulfates, chlorides and nitrates, and is understood to not include the passivating anions, present in the amorphous aluminum phosphate. In a preferred embodiment, the amount of nonpassivating solubles is zero. A maximum amount of nonpassivating solubles is 250 ppm.

It has been discovered that the presence of such solubles, if left unchecked, can operate to impair the stability and/or integrity of the anticorrosion coating composition and/or the cured film formed therefrom, thereby adversely affecting its intended service life. For example, the presence of such solubles has been found to result in unwanted blistering, delamination from the substrate, under-film corrosion and other types of unwanted film failures when exposed to certain corrosive environments, which film failures operate to expose the underlying metallic substrate surface leaving it unprotected.

In an example embodiment, it is desired that the anticorrosion coating composition comprise less than about one percent (or less than 10,000 ppm) of such total solubles, i.e., solubles including phosphate passivating anion, preferably less than about 1,500 ppm total solubles, and more preferably less than about 400 ppm total solubles. In an example embodiment, the anticorrosion coating composition comprises in the range of from about 50 to 800 ppm total solubles, and preferably in the range of from about 100 to 250 ppm total solubles. Anticorrosion coating compositions comprising less than about 1,500 ppm total solubles produce cured films that, when subjected to end use corrosive environments, do not demonstrate blistering or other unwanted film events, thereby operating to enhance effective service life. Accordingly, a feature of anticorrosion coating compositions is that, in addition to providing a controlled release of passivating anion, they are specially engineered to have a reduced amount of total solubles to ensure an intended service life.

Binary Condensation Method of Making

Generally, the amorphous aluminum phosphate is a phosphate complex in which the nucleating cation is aluminum alone, or aluminum in combination with other multi-valent cations such as calcium, magnesium, barium and the like. In an example embodiment, it is desired that the method of making the amorphous aluminum phosphate be one that produces amorphous aluminum phosphate that is free of all other metal cations, especially one that is free of alkali metal cations. As disclosed herein, the phosphate complex is prepared by combining a suitable aluminum salt, such as aluminum hydroxide, aluminum sulfate and the like in phosphoric acid or a phosphate, depending on the particular aluminum salt used to form an aluminum phosphate. The composition of the resulting condensed solid depends on the ratio of the metal to the phosphate anion. The properties of the resulting complex, i.e., the amorphous aluminum phosphate, depends on the processing parameters employed during the condensation reaction, including choice of aluminum salt, temperature, order of addition of reactants, rate of addition of reactants, the degree and duration of agitation, and pretreatment of one or more of the reactants.

A surprising result is that the resulting condensed solid, even after milling, has a very low oil absorption property and low surface area (as measured by BET method) when compared to aluminum phosphate prepared by other known methods. Oil absorption is defined as the amount (grams or pounds) of linseed oil required to wet out and fill the voids spaces around a pigment, ASTM-D-281-84, which is a measure of the binder demand or the amount of binder resin that a pigment may absorb in a given formulation. High binder demand adds to formulation cost and can affect certain barrier properties of the dry film. This is further surprising because the aluminum phosphate made by the binary condensation process disclosed herein also displays the controlled release property and water adsorption property usually associated with high surface area particles.

In a example embodiment, the condensed aluminum phosphate prepared herein has an oil absorption of less than about 50, preferably in the range of between about 10 to 40, and more preferably in the range of between about 20 to 30. In contrast, aluminum phosphate that is made by other methods has an oil absorption of greater than about 50, and typically in the range of about 50 to 110.

In an example embodiment, the condensed aluminum phosphate prepared herein has a surface area of less than about 20 m$^2$/g, and preferably less than about 10 m$^2$/g. IN an example embodiment, the surface area is in the range of between about 2 to 8 m$^2$/g, and more preferably in the range of between about 3 to5 m$^2$/g. In contrast, aluminum phosphate that is made by other methods has a surface area greater than 20 m$^2$/g, e.g., from about 30 to 135 m$^2$/g.

Thus, amorphous aluminum phosphates included in anticorrosion coating compositions are made as a binary condensation product by combining selected starting materials including an aluminum source and a phosphorous source under specific conditions of controlled material delivery, temperature, and agitation. The judicious selection of starting materials and process conditions produces amorphous aluminum phosphates having a material content and chemical structure intentionally created with the purpose of producing the above-noted combined engineered properties of desired passivating anion content, controlled delivery/release of the passivating anion, and desired reduced total solubles and high water adsorption.

Aluminum sources useful for forming amorphous aluminum phosphate by condensation include aluminum salts, such as aluminum chloride, aluminum nitrate, aluminum sulfate and the like. Preferred aluminum sources include aluminum hydroxide and aluminum sulfate. Phosphorous sources useful for forming amorphous aluminum phosphate by condensation include phosphoric acid, and salts of phosphorus as orthophosphates or as polyphosphates. A source of phosphorus is fertilizer grade phosphoric acid, from any origin, that has been clarified and discolored. For example, a commercial phosphoric acid containing approximately 54% of $P_2O_5$ may be chemically treated and/or diluted with treated water resulting in a concentration of approximately 20% of $P_2$.

Amorphous aluminum phosphate can be made through the selective combination the materials noted above. The following selected methods of preparation are provided below as examples, and it is to be understood that other methods of preparation other than those specifically disclosed may be used.

EXAMPLE NO. 1

In an example embodiment, amorphous aluminum phosphate having the above-noted engineered properties is prepared by combining phosphoric acid, $H_3PO_4$, with aluminum hydroxide, $Al(OH)_3$, at room temperature to form the desired amorphous aluminum phosphate. The $H_3PO_4$ was diluted with water before being added to the $Al(OH)_3$, and prior to addition the $Al(OH)_3$ was not wetted with water. Thus, a feature of this method of preparing is that it did not include the addition of free water after combination of the reactants, and was performed at room temperature without heating. In an example embodiment, the $H_3PO_4$ was 85wt % in water provided by Sigma-Aldrich, and the $Al(OH)_3$ was reagent grade, 50-57%, provided by Sigma-Aldrich. Specifically, approximately 57.3 g $H_3PO_4$ was diluted with 50 g of water before being combined with $Al(OH)_3$. Approximately 39 g of $Al(OH)_3$ was added to the solution quickly and the mixture was stirred slowly at room temperature to wet the powder. An amorphous aluminum phosphate condensed solid was formed and existed as a dispersion of solid particles in solution. Diluting the $H_3PO_4$ prior to addition of the $Al(OH)_3$ is believed to contribute to forming exclusively amorphous aluminum phosphate, e.g., wherein there is no crystalline form produced. The suspension was filtered to isolate the amorphous aluminum phosphate particles. The particles were washed and dried at low temperature conditions, e.g., less than about 130° C. A further feature of the amorphous aluminum phosphate so formed is that it is combined with the desired binding polymer, useful for forming the anticorrosive coating composition, without the need for further heat treatment, tempering, or calcining, e.g., heating at temperatures above 200° C., which is not desired as such heat treatment initiates the conversion of the desired amorphous form of aluminum phosphate to an undesired crystalline form.

EXAMPLE NO. 2

In another example embodiment, amorphous aluminum phosphate having the above-noted engineered properties is prepared by combining $H_3PO_4$ with $Al(OH)_3$ to form the desired amorphous aluminum phosphate. Unlike example 1, the $H_3PO_4$ was not diluted before being added to the $Al(OH)_3$. However, before combining, the $H_3PO_4$ was heated. Additionally, prior to combining with the $H_3PO_4$, the $Al(OH)_3$ was wetted with water. A feature of this method of preparing is that it did not include the addition of free water after combination of the reactants. In an example embodiment, the $H_3PO_4$ was 85wt % in water provided by Sigma-Aldrich, and the $Al(OH)_3$ was reagent grade, 50-57%, provided by Sigma-Aldrich. Specifically, approximately 57.6 g $H_3PO_4$ was heated to a temperature of about 80° C. Approximately 39 g of $Al(OH)_3$ was wetted with about 2 g water and the wetted $Al(OH)_3$ was quickly added to the $H_3PO_4$ under fast mechanical stirring. An amorphous aluminum phosphate solid was formed and existed as a dough-like ball that was removed and stored at room temperature. A feature of the amorphous aluminum phosphate so formed is that further treatment in the form of filtering and washing was not necessary to isolate and obtain the desired amorphous aluminum phosphate. Like example 1, such amorphous aluminum phosphate (once dried and formed into the desired particle size) was combined with the desired binding polymer, useful for forming the anticorrosive coating composition, without the need for further heat treatment, tempering, or calcining, e.g., without heating at temperatures above 200° C.

In these example processes, a chemical reaction results in the formation of amorphous aluminum orthophosphate or of aluminum orthophosphates ($Al_2(HPO_4)_3$ or $Al(H_2PO_4)_3$. The reaction, is carried out through the mixture of the two ingredients. The reagents are dosed in a reactor equipped with a stirring device, and allowed to react for a short period of time, e.g., less than about 10 minutes.

As noted above, a feature of the amorphous aluminum phosphate made herein and included in the anticorrosion coating composition is that it has a reduced/low total solubles content. The desired low total solubles content is inherent in this method of making because there are no byproducts, e.g., other metal cations such as alkali metal cations or the like, produced other than water from the reaction. Accordingly, an advantage of this binary condensation method of making amorphous aluminum phosphate is that there is no need to perform any subsequent solubles removal treatment, thereby reducing manufacturing cost and time. Rather, the amorphous aluminum phosphate formed by the condensation reaction can be isolated from solution by conventional method, such as by filter press or the where the liquid phase (sometimes referred to as the "liquor") is separated from the solid phase (sometimes referred to as the "cake"). The wet cake, containing approximately 35% to 45% of solids can be optionally washed if desired in one or more steps. The resulting isolated amorphous aluminum phosphate can be dried using conventional drying equipment, such as a "turbo dryer" or the like, at a temperature of less than about 200° C., preferably temperatures of from about 40 to 140° C., and more preferably at temperatures of less than about 130° C. The final water content of the resulting dried amorphous aluminum phosphate product is between about 10% to 20% by weight water. While the use of a particular drying technique has been disclosed, it is to be understood that other types of drying techniques can be used.

The amorphous aluminum phosphate by the processes noted above has a P:Al ratio of from about 0.5:1 to 1.5:1. It is desired that the amorphous hydroxy aluminum phosphate have a P:Al ratio in this range because this provides a suitable range of particle morphology and properties that are compatible with the targeted coating formulation chemistries. Also, the phosphate release rates for such solids in this range provide the desired level of passivation for corrosion prevention.

After forming the amorphous aluminum phosphate condensed solid, the solid is treated to give a white powder having a desired particle size or size distribution. The particle size will depend on such factors such as the binding polymer, the particular end-use application, and the method of applying the coating composition. In an example embodiment, the amorphous aluminum phosphate has a particle size distributions of D50 from about 0.5 to 8 microns. In an example embodiment, it is desired that the amorphous hydroxy aluminum phosphate have a P:Al ratio of from about 0.9 to 1, and have a particle size distribution of D50 of about 1 micron and D90 less than about 4 microns. For use in an anticorrosion coating composition it is desired that the amorphous aluminum phosphate have a particle size of less than about 20 microns, and preferably in the range of from about 0.5 to 10 microns, and more preferably in the range of from about 1.0 to 8.0 microns. Particle sizes of less than about 0.5 microns may interfere with the processing of coating formulations and adversely affect film properties by increasing binder resin absorption.

Enhanced control over the essential characteristics of amorphous aluminum phosphate is achieved by manipulating the concentration of the aluminum source, which operates to adjust and fine tune the P:Al ratio in the resulting amorphous aluminum phosphate to the desired amount noted above, thereby promoting the formation of an amorphous aluminum phosphate capable of providing a desired controlled delivery of passivating anion. Additionally, the method of making noted above provides an inherent process of controlling unwanted solubles content, as such solubles are not a byproduct of the formation reaction, thereby promoting formation of a coating composition having a desired film stability and integrity.

Amorphous aluminum phosphates prepared as noted above are preferably not subjected to high-temperature drying or other thermal treatment for the purpose of retaining the amorphous structure and avoiding conversion to a crystalline structure. It has been discovered that amorphous aluminum phosphates formed in this manner retain the desired amorphous structure, even after low temperature drying, and this structure provides a distinct benefit/feature for use as a corrosion inhibiting pigment. Such amorphous aluminum phosphates display a markedly increased water adsorption potential or degree of rehydration when compared to crystalline aluminum phosphates, that permits such amorphous aluminum phosphates, once dehydrated by drying, to be rehydrated to contain up to about 25 percent by weight water. This feature is especially useful when the amorphous aluminum phosphate is used with anticorrosion coating compositions comprising a nonwater-borne binding polymer. In such coating compositions the amorphous aluminum phosphates acts, in addition to being an corrosion inhibiting pigment, as a moisture scavenger to both slow water intrusion into the cured film and restrict water diffusion through the cured film. Thus, this water adsorption feature operates to provide another moisture barrier mechanism of corrosion control. This effect has been demonstrated by the use of electroimpedence spectroscopy (EIS).

Anticorrosion coating compositions are prepared by combining a selected binding polymer with the amorphous aluminum phosphate in the amounts described above. The amorphous aluminum phosphate can be provided for composition formulation in the form of a dried powder or can be provided in the form of a slurry or liquid suspension depending on the formulation conditions or preferences.

Table 1 presents an example anticorrosion coating composition formulation in the form of an epoxy-polyamide primer composition prepared in the manner disclosed herein for purposes of reference.

TABLE 1

Example Epoxy-Based Anticorrosion Coating Composition

Solvent Based two parts
Epoxy Primer Formula

Part 1

| | |
|---|---:|
| Epoxy resin | 238.1 bs |
| Additive | 3 lbs |
| Pigment dispersant | 5 lbs |
| Solvent 1 | 75 lbs |
| Solvent 2 | 20.4 lbs |
| Anti-settling additive | 10.2 lbs |
| Red iron oxide pigment | 120.4 lbs |
| Anticorrosive pigment | 150 lbs |
| Extender pigment 1 | 341.3 lbs |

TABLE 1-continued

Example Epoxy-Based Anticorrosion
Coating Composition

Solvent Based two parts
Epoxy Primer Formula

| Extender pigment 2 | 120.3 lbs |
|---|---|
| Extender pigment 3 | 78.5 lbs |
| Disperse high speed to Hegman 5-6 | |
| Epoxy resin | 24.8 lbs |
| Solvent | 96.3 lbs |
| Part 2 | |
| Curing agent | 142.2 lbs |

In this example, the first epoxy resin is a liquid epoxy resin based on the di-glycidyl ether or bis-phenol A such as EPON 828 (Hexion Chemical), the additive is an polymer that facilitates flow-out in film formation (Cytec), the pigment dispersant is an additive such as Anti-terra U (BykChemie), solvent 1 is an aromatic solvent such as toluene or xylene, solvent 2 is glycol ether, the anti-settling additive is a thixatrope such as Bentone SD, the prime color pigment is red iron oxide, the anticorrosive pigment is the amorphous aluminum phosphate prepared by the method of making disclosed above and is provided in the form of a dried powder, extender pigment 1 is barium sulphate, extender pigment 2 is magnesium silicate, extender pigment 3 is mica, the second epoxy resin is the same as the first addition, the third solvent is xylene, and the curing agent is polyamide resin such as EPIKURE 3175 (Hexion). The loading of the amorphous aluminum phosphate was approximately 10 percent by weight based on the total weight of the composition. Additionally, variations of this example formulation are prepared at amorphous aluminum phosphate loading levels of 5 and 15 weight percent.

The epoxy-based example samples were studied using electro-impedance spectroscopy (EIS). An unexpected result from the EIS testing was the observation that the incorporation of up to 15% by weight amorphous aluminum phosphate in epoxy-based samples demonstrated increased impedance in the epoxy film by up to an order of magnitude compared to control. This result was found for both the 5% and 15% loadings of the amorphous aluminum phosphate in epoxy. This result indicates that the amorphous aluminum phosphate in these samples operates to enhance the barrier properties of the epoxy binding polymer by acting as a water scavenger, thereby removing diffusing water from the matrix.

As water penetrates into the film, it is attracted to and accumulated at the amorphous aluminum phosphate particles present in the film. The water is preferentially adsorbed by the amorphous aluminum phosphate, and only after local particle saturation has occurred will any water proceed beyond that location in the film. When this occurs, the next layer of amorphous aluminum phosphate will adsorb the water. This absorption of water by the amorphous aluminum phosphate significantly slows the diffusion of water through the film, and thereby increases the service life of the film. Further, the presence of water around the re-hydrated, saturated amorphous aluminum phosphate particles results in the release of phosphate anion into the migrating water. Hence, even if the service life is sufficiently long to allow diffusion of water through the film to the substrate, the aqueous solution reaching the substrate will contain passivating phosphate anion thereby preventing corrosion of the steel substrate. Further, the ability of the amorphous aluminum phosphate to release inhibiting quantities of phosphate anion provides corrosion inhibition at the sites of physical defects or damage in the film.

As noted above, despite the unique morphology properties of the solid (low oil absorption and low surface area), the aluminum phosphate produced by binary condensation is effective as a water scavenger. Further, amorphous aluminum phosphate made by such process has a low oil absorption measurement, indicating that when incorporated in coating compositions it has a low binder demand. This ensures that the incorporation of the amorphous aluminum phosphate of this method will not increase the cost of the formulation nor will it interfere with color development or gloss appearance properties of the resulting dry film.

This discovery allows the practical incorporation of amorphous aluminum phosphate as a barrier enhancer in mid-coats and topcoats, and not simply in primers. Conventional inhibitive pigments have value only in primers because they provide only a passivation mechanism of corrosion control. Amorphous aluminum phosphate and coating compositions comprising as disclosed herein protects from corrosion by the dual mechanism of enhancing the barrier properties of the coating by water adsorption, and releasing passivating anion.

Table 2 presents an example anticorrosion coating composition formulation in the form of an acrylic latex primer composition prepared in the manner disclosed herein for purposes of reference.

TABLE 2

Example Acrylic Latex Based Anticorrosion
Coating Composition

Water-based Primer Formula

| Water | 111 lbs |
|---|---|
| Pigment dispersant-Surfynol CT-131 | 23.4 lbs |
| TiO2 color pigment | 104.4 lbs |
| Ammonium hydroxide 25% | 1.6 lbs |
| Corrosion Inhibitive Pigment | 50 lbs |
| Extender Pigment-calcium carbonate | 183.7 lbs |
| Disperse under high sheer 30 minutes | |
| Then mix in the following | |
| Defoamer-Drewplus L-475 | 1.1 lbs |
| Coalescent-I Eastman EB | 49.2 lbs |
| Latex resin-Aquamac 740 | 506 lbs |
| Coalescent II-Texanol ester alcohol | 9 lbs |
| Coalescent III-Dowanol DPnB | 14 lbs |
| Dispersant/surfactant-Surfynol DF 210 | 2.4 lbs |
| Additive | 12.3 lbs |
| Plasticizer-Santicizer 160 | 12.3 lbs |
| Flash Rust Inhibitor-ammonium benzoate | 3 lbs |
| HASE Thickener-Acrysol TT 615 | 4.06 lbs |
| Defoamer | 1.4 lbs |

In this example, the pigment dispersant is Surfynol CT-131, the corrosion inhibitive pigment is amorphous aluminum phosphate prepared by the methods disclosed above and is provided in the form of powder, the defoamer is Drewplus L-475, coalescent 1 is Eastman EB, coalescent 2 is Dowanol DPnB, coalescent 3 is Texanol ester alcohol, the dispersant/surfactant is Surfynol DF 210, the plasticizer is Santicizer 160, the flash rust inhibitor is ammonium benzoate salt, the HASE thickener is Acrysol TT 615. The loading of the amorphous aluminum phosphate in this formulation was approximately 4.6 percent by weight based on the total weight of the composition.

As demonstrated above, embodiments of the invention provide a novel anticorrosion coating composition comprising amorphous aluminum phosphate. While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein.

For example, if desired, anticorrosion coating compositions can be prepared comprising one or more elements known to have anticorrosive value in addition to the amorphous aluminum phosphate, e.g., cations such as zinc, calcium, strontium, chromate, borate, barium, magnesium, molybdenum and combinations thereof. The addition of such other element can operate to increase or complement the anticorrosive effect of the coating composition.

Additionally, while anticorrosion coating compositions as described herein are engineered to include aluminum phosphate in an amorphous form, it is to be understood that anticorrosion compositions as described herein can comprise aluminum phosphate in its known crystalline forms. For example, such crystalline aluminum phosphate can be present in amounts that do not otherwise adversely impact or impair the engineered anticorrosion mechanisms and/or properties of the coating composition.

Variations and modifications from the described embodiments exist. The method of making the coating compositions and/or amorphous aluminum phosphate is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An anticorrosive coating composition comprising:
a binding polymer;
an aluminum phosphate corrosion inhibiting pigment comprising an untempered amorphous aluminum hydroxyl orthophosphate condensate dispersed within the binding polymer, wherein the amorphous aluminum hydroxyl orthophosphate has an oil absorption of less than about 50; and
wherein the coating composition comprises in the range of from about 1 to 25 percent by weight of the amorphous aluminum hydroxyl orthophosphate , wherein the coating composition provides a controlled delivery of phosphate anion to provide corrosion protection to an underlying metal surface by passivation when the coating composition is in the form of a cured film, and wherein the coating composition has a total solubles content of from about 50 to 800 ppm, wherein the total solubles content includes the phosphate anion.

2. The coating composition as recited in claim 1 wherein the amorphous aluminum hydroxyl orthophosphate has an alkali metal or alkaline earth metal content of less than about 250 ppm.

3. The coating composition as recited in claim 1 having a total solubles content of from about 100 to 250 ppm.

4. The coating composition as recited in claim 1 wherein the controlled phosphate anion delivery is between about 50 to 500 ppm.

5. The coating composition as recited in claim 1 additionally comprising a material comprising an element selected from the group consisting of zinc, calcium, strontium, chromate, borate, barium, molybdenum and combinations thereof.

6. The coating composition as recited in claim 5 wherein the material comprises zinc.

7. The coating composition as recited in claim 1 wherein the amorphous aluminum hydroxyl orthophosphate has a water adsorption potential of up to about 25 percent by weight water.

8. A primer coating formed from the coating composition recited in claim 1, wherein the primer coating is disposed onto a metallic substrate.

9. The coating composition as recited in claim 1 wherein the binding polymer is selected from the group consisting of polyurethanes, polyesters, solvent-based epoxies, solventless epoxies, water-borne epoxies, epoxy copolymers, acrylics, acrylic copolymers, silicones, silicone copolymers, polysiloxanes, polysiloxane copolymers, alkyds and combinations thereof.

10. A system for providing anticorrosion protection comprising a coating composition applied to metallic substrate and allowed to cure to form a film, the film comprising a binding polymer having an aluminum phosphate corrosion inhibiting pigment comprising untempered amorphous aluminum hydroxyl orthophosphate dispersed therein, wherein the amorphous aluminum hydroxyl orthophosphate is prepared by combining aluminum hydroxide with phosphoric acid at room temperature conditions, wherein the amorphous aluminum hydroxyl orthophosphate has an oil absorption of less than about 50, the coating composition comprising in the range of from about 1 to 25 percent by weight of the amorphous aluminum hydroxyl orthophosphate based on the total weight of the coating composition, the film having a controlled delivery of phosphate anion of between about 50 to 500 ppm, and wherein the amorphous aluminum hydroxyl orthophosphate is free of any alkali metals.

11. The system as recited in claim 10 wherein the aluminum phosphate corrosion inhibiting pigment consists of the amorphous aluminum hydroxyl orthophosphate.

12. The system as recited in claim 10 comprising a passivating film interposed between the coating composition and a surface of the metallic substrate, wherein the passivating film is a reaction product formed between the phosphate anion and the metallic substrate.

13. The system as recited in claim 10 wherein the binding polymer comprises epoxy and the amorphous aluminum hydroxyl orthophosphate absorbs up to about 25 percent by weight water that enters the cured film.

14. The system as recited in claim 10 wherein the coating composition has a total solubles content of between about 50 to 800 ppm, wherein the total solubles content includes the phosphate anion.

15. The system as recited in claim 10 wherein the coating composition has a total solubles content of from about 100 to 250 ppm, wherein the total solubles content includes the phosphate anion.

16. The system as recited in claim 10 wherein the amorphous aluminum hydroxyl orthophosphate has a water adsorption potential of up to about 25 percent by weight water.

17. The system as recited in claim 10 wherein the coating composition is a primer coating that is disposed onto the metallic substrate.

18. The system as recited in claim 10 wherein the coating composition is a mid-coat or top-coat coating that is disposed on the metallic substrate or a primer layer disposed on the metallic substrate.

19. The system as recited in claim 10 wherein the coating composition has a controlled delivery of the phosphate anion of between 100 to 200 ppm.

20. The system as recited in claim 10 additionally comprises a material comprising an element selected from the group consisting of zinc, calcium, strontium, chromate, borate, barium, molybdenum and combinations thereof.

21. The system as recited in claim 20 wherein the material comprises zinc.

22. An anticorrosion coating disposed on a metallic substrate, wherein the coating is prepared by:
preparing an aluminum phosphate corrosion inhibiting pigment by combining starting materials comprising aluminum hydroxide with phosphoric acid each at room temperature conditions and reacting the combined starting materials to form a solution comprising an aluminum phosphate condensate;
drying the condensate at a temperature of less than about 200° C., wherein the dried condensate comprises amorphous aluminum hydroxyl orthophosphate; and
mixing the amorphous aluminum hydroxyl orthophosphate with a binding polymer to form the coating composition, wherein the amorphous aluminum hydroxyl orthophosphate is untempered prior to mixing, and wherein the amorphous aluminum hydroxyl orthophosphate comprises less than about 25 percent by weight of the of the total weight of the coating composition;
wherein the coating has a total solubles content of between 50 to 800 ppm, and a controlled phosphate anion delivery of from about 50 to 500 ppm, wherein the total solubles content includes the phosphate anion and wherein the amorphous aluminum hydroxyl orthophosphate has an oil absorption less than about 50.

23. An anticorrosive coating composition comprising:
a binding polymer;
an aluminum phosphate corrosion inhibiting pigment comprising amorphous aluminum hydroxyl orthophosphate condensate prepared by combining aluminum hydroxide and phosphoric acid at room temperature conditions, wherein the amorphous aluminum hydroxyl orthophosphate is not subjected to elevated temperature conditions above 200° C. before being combined with the binding polymer, wherein the amorphous aluminum hydroxyl orthophosphate is dispersed within the binding polymer and has an oil absorption of less than about 50; and
wherein the coating composition comprises in the range of from about 1 to 25 percent by weight amorphous aluminum hydroxyl orthophosphate, wherein the coating composition provides a controlled delivery of phosphate anion in the range of from about 50 to 500 ppm when the coating composition is in the form of a cured film, and wherein the coating composition has a total solubles content of between about 50 to 800 ppm, wherein the total solubles content includes the phosphate anion.

24. The coating composition as recited in claim 23 wherein the aluminum phosphate corrosion inhibiting pigment consists of the amorphous aluminum hydroxyl orthophosphate.

25. The coating composition as recited in claim 23 additionally comprising a material comprising an element selected from the group consisting of zinc, calcium, strontium, chromate, borate, barium, molybdenum and combinations thereof.

26. The coating composition as recited in claim 25 wherein the material comprises zinc.

27. An anticorrosive coating composition comprising:
a binding polymer;
an aluminum phosphate corrosion inhibiting pigment comprising amorphous aluminum hydroxyl orthophosphate condensate dispersed within the binding polymer; and
wherein the coating composition comprises in the range of from about 1 to 25 percent by weight amorphous aluminum hydroxyl orthophosphate, wherein the coating composition provides a controlled delivery of phosphate anion in the range of from about 50 to 500 ppm when the coating composition in the form of a cured film, and wherein the coating composition additionally comprises a material comprising zinc, and wherein the amorphous aluminum hydroxyl orthophosphate is free of any alkali metals and has an oil absorption of less than about 50.

28. The coating composition as recited in claim 27 wherein the aluminum phosphate corrosion inhibiting pigment consists of the amorphous aluminum hydroxyl orthophosphate.

\* \* \* \* \*